United States Patent [19]

Huebner et al.

[11] 4,201,486
[45] May 6, 1980

[54] PROCESS FOR THE MANUFACTURE OF MAGNETIC RECORDING MEDIA

[75] Inventors: Werner Huebner, Frankenthal; Job-Werner Hartmann, Ludwigshafen; Friedrich Domas, Altlussheim; Peter Nagel, Willstaett; Paul Deigner, Weisenheim; Eberhard Koester; Hans Hauser, both of Frankenthal, all of Fed. Rep. of Germany

[73] Assignee: BASF Aktiengesellschaft, Ludwigshafen, Fed. Rep. of Germany

[21] Appl. No.: 905,040

[22] Filed: May 11, 1978

[30] Foreign Application Priority Data

May 16, 1977 [DE] Fed. Rep. of Germany ....... 2722078

[51] Int. Cl.² .......................... B01F 15/02; B01F 7/10
[52] U.S. Cl. ..................................... 366/196; 366/315

[58] Field of Search ............... 366/315, 302, 303, 304, 366/168, 196, 98, 176

[56] References Cited

U.S. PATENT DOCUMENTS

| 2,929,107 | 3/1960 | Andrew | 366/98 |
| 3,995,838 | 12/1976 | Zucker | 366/304 |

FOREIGN PATENT DOCUMENTS

271335  7/1964  Netherlands ............................ 366/315

Primary Examiner—George F. Mautz
Attorney, Agent, or Firm—Keil & Witherspoon

[57] ABSTRACT

A process and apparatus for the manufacture of magnetic recording media, in which, immediately before the magnetic dispersion is applied to a base, the dispersion is subjected to shear by means of a disc rotatably mounted in a housing, by introducing it at the center of rotation of the disc and forcing it through a gap formed between the face of the disc and the wall of the housing, which gap tapers toward the rim of the disc.

8 Claims, 1 Drawing Figure

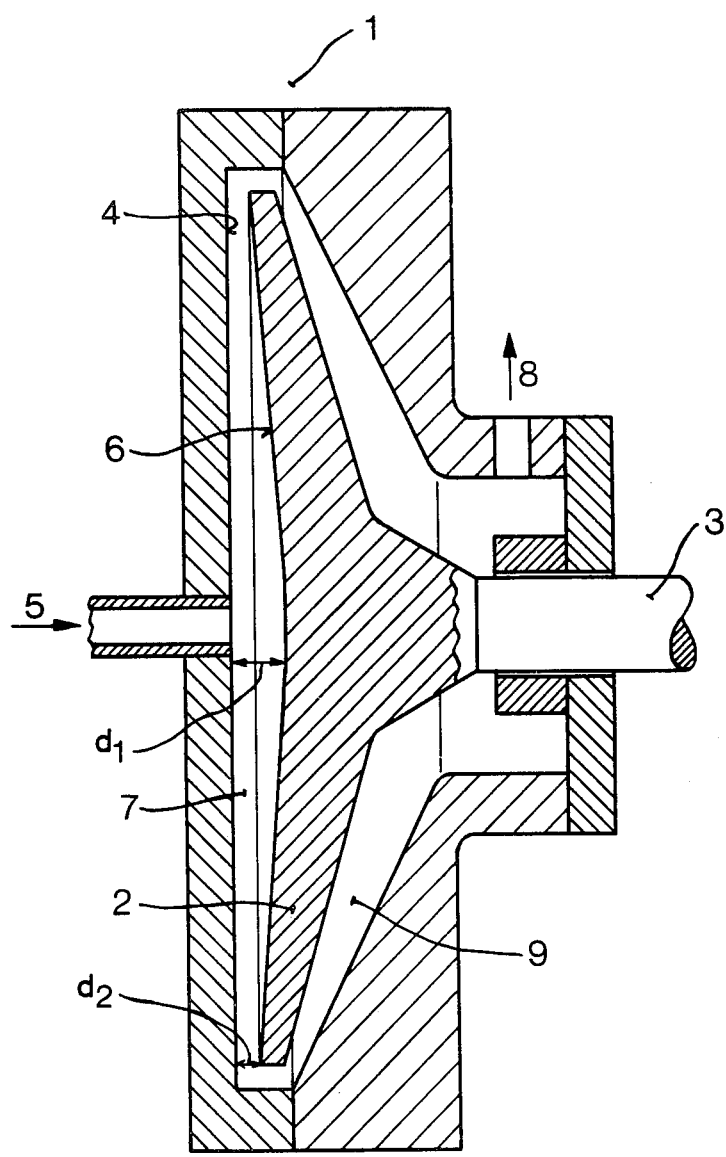

PROCESS FOR THE MANUFACTURE OF MAGNETIC RECORDING MEDIA

The present invention relates to a process for the manufacture of magnetic recording media, wherein, immediately before the magnetic dispersion is applied to a non-magnetic base, the flowing magnetic dispersion is subjected to shear by producing a shear gradient in the dispersion, and also to an apparatus for carrying out the process.

In the manufacture of magnetic recording media, a magnetic orienting device is generally located downstream of the coating apparatus, which device orients the acicular magnetizable particles in the desired playing direction before the dispersion is dried, the magnetic dispersion being passed, immediately after having been applied to the web of base material, through the field of a permanent magnet or electromagnet. The magnetic particles, which are usually acicular, are thus aligned with their longitudinal axes along the magnetic field lines. As a result of this magnetic orientation, the finished magnetic tape exhibits a higher residual induction in the direction of orientation of the magnetic particles than in the direction crosswise thereto. The ratio of these two parameters, referred to as the orientation ration, is a measure of the degree of alignment of the magnetic particles.

Orientation improves the magnetic properties of the magnetic recording medium. The ability of the magnetic particles to undergo orientation depends, inter alia, on the magnetic pigment used, on the composition of the viscous fluid magnetic dispersion, especially on the binder, solvent and dispersing agent used, and on the physical properties of the dispersion, e.g. the viscosity, yield value and the like.

There has been no lack of attempts and proposals to improve the orientation ratio. For example, it has been found that improved orientation ratios can be achieved by using dispersions having as high a viscosity and as high a yield value as possible. However, improvement by this means cannot be carried beyond a certain point because the magnetic dispersion does not give satisfactory coatings if the viscosity or yield value is too high. This is because, if the yield value is increased excessively, the surface smoothness suffers due to the nature of the coating technique, the magnetic layers exhibiting ridges or other surface flaws.

German Pat. No. 2,119,569 proposes to subject the magnetic dispersion to shear by passing it through the annular gap formed between the inner wall of a cylindrical stirring vessel and the periphery of a disc or cylinder rotating therein. The disc used is as a rule a dissolver disc possessing saw teeth at its periphery. However, the effect that can be achieved is only slight. If the speed of the disc or the cylinder is increased, the orientation ratio rapidly reaches a maximum value which is less than 1.8. Furthermore, the orientation ratio increased by this method cannot be exploited for practical purposes because as the speed of rotation increases, there is a marked increase in the number of inhomogeneities in the magnetic dispersion.

It is an object of the present invention to provide a process and apparatus for exerting a shearing action on the magnetic dispersion, by means of which a much greater increase in the orientation ratio can be achieved without increasing the number of inhomogeneities in the magnetic dispersion.

We have found that this object is achieved by a process in which, prior to application of a magnetic dispersion to a nonmagnetic base, the magnetic dispersion is subjected to shear by setting up a shear gradient D in the magnetic dispersion, the magnetic dispersion being fed to the inlet of a gap formed between a member and a confronting face of a disc rotating relative to the member and being forced to flow radially outwards through said gap, the disc being spaced from said member a distance $d_1$ at said inlet and a distance $d_2$ at its periphery, the shear gradient D in the gap being calculated in accordance with the equation $$D = \frac{n \times \pi}{60 \times (d_1 + d_2) \times (1/d - 0.0045)} \ [\text{sec}^{-1}]$$

where n is the rotational speed of the disc relative to said member in revolutions per minute, and d is the diameter at the particular point of action of the disc, d, $d_1$, and $d_2$ being in mm.

The invention also relates to an apparatus for carrying out the process according to the present invention, comprising a housing, a disc rotatably mounted in the housing and having a face which confronts either an adjacent wall of the housing or a further disc rotatable relative to the first-mentioned disc to define a gap therebetween for the passage of the magnetic dispersion therethrough, the gap having an inlet arranged concentrically with the axis of the disc and an outlet at the periphery of the disc, drive means for rotating said disc or discs to set up a shear gradient in a magnetic dispersion flowing through the gap, and at least one outlet in the housing for the magnetic dispersion after it has passed through said gap.

The apparatus of the invention may be utilized for all types of magnetic dispersions provided they consist of a magnetic pigment dispersed in a binder containing a solvent. The apparatus is particularly suitable for magnetic dispersions of low viscosity. As a result of the increase in the orientation ratio achievable with the process and apparatus of the invention, the recording properties, e.g. the sensitivity, signal level and maximum output level, of magnetic recording media produced with the magnetic dispersions treated in this way can be substantially improved without the quality of the magnetic layer being adversely affected; in fact, the surface smoothness of the magnetic layer is improved. In the case of magnetic data discs it is possible to considerably increase the strength of the reproduced signal at the same resolution.

Further details of the invention are disclosed in the following description of the apparatus illustrated in the accompanying drawing which is a diagrammatic longitudinal section of the apparatus of the invention.

A disc 2 is rotatably mounted in a housing 1 and can be driven by the shaft 3. The front wall 4 of the housing 1, which has a central feedline 5 for the magnetic dispersion, forms, with the face 6 of the disc 2, a gap 7 in which the magnetic dispersion which flows radially outwards is subjected to shear as a result of the rotation of the disc 2 relative to the wall 4. One or more lateral outlets 8 are provided in the rear part of the housing 1 to allow the magnetic dispersion, which flows round the disc 2, to leave the housing. The space 9 between the back of the disc 2 and the rear part of the housing is at least five times, preferably 10 times, wider than the gap 7 so that the resistance to flow in this space, especially the resistance caused by the centrifugal force produced by the disc 2, is as low as possible.

It has proved advantageous, as far as the homogeneity of the magnetic dispersion to be applied is concerned, to keep the radial flow rate in the gap 7 as constant as possible. The gap 7 therefore tapers toward the rim of the disc. As regards the degree of taper, it has been found that the ratio of the gap width $d_1$ in the center of the disc 2 to the gap width at the periphery $d_2$ should be from 20:1 to 5:1, preferably 10:1. To avoid inhomogeneities in the stream of magnetic dispersion, for example imhomogeneities in the form of small air bubbles caused by the acceleration of the stream along the surface of the disc, it is advantageous to feed the magnetic dispersion into the housing 1 by means of a pump whose pumping force is at least as great as the force exerted by the flow of the magnetic dispersion, which force is produced by the centrifugal force of the rotating disc 2 and acts in the pumping direction. Preferred types of pumps are gear pumps, membrane pumps and piston pumps.

The above conditions for a constant flow rate are achieved with a disc 2 having a diameter of from 80 to 400 mm if the gap width in the center of the disc, $d_1$, is from 0.5 to 5 mm, and the gap width at the periphery, $d_2$, is from 0.05 to 0.5 mm. The required shearing forces are produced at speeds of the disc 2 of from 500 to 5,000 rpm, preferably from 2,000 to 3,500 rpm.

For example, in one embodiment of the apparatus according to the invention, the shearing forces acting on the magnetic dispersion are produced by pumping the dispersion, having a viscosity of from 25 mPas to 50 mPas, through the gap 7, having a width $d_1$ of 3.0 mm and a width $d_2$ of 0.3 mm, at a throughput of from 100 to 280 kg/h. The disc 2 has a diameter of 200 mm and rotates at 3,000 rpm. For magnetic dispersions having a viscosity of more than 150 mPas, advantageous widths would be $d_1 = 5$ mm and $d_2 = 0.5$ mm.

The apparatus according to the invention may be made of any material which is resistant to the magnetic dispersion to be treated, preferably steel.

The apparatus of the invention makes it possible to progressively increase the shear gradient D in the flowing magnetic dispersion in accordance with the equation $$D = \frac{n \times \pi}{60 \times (d_1 + d_2) \times (1/d - 0.0045)} \ [\text{sec}^{-1}]$$

where n is the number of revolutions per minute of the disc 2, d is the diameter at the particular point of action of the disc 2, $d_1$ is the width at the inlet of the gap and $d_2$ the width of the outlet of the gap, d, $d_1$ and $d_2$ being in mm.

The shear gradient in the gap 7 is 500 sec$^{-1}$ immediately radially outward of the inlet to the gap.

The preferred shear gradient range in which an effective increase in the orientation ratio is achieved without there being any increase in the number of flaws in the applied layer, is from 50,000 sec$^{-1}$ to 500,000 sec$^{-1}$.

The housing 1 described above, with the disc 2 rotatably mounted therein, is located upstream of a coating device (not shown in the drawing) for applying the magnetic dispersion. As is well known, this coating device consists for example of a chamber with an orifice in the vicinity of the base to be coated, and a doctor blade. In the region where the magnetic dispersion is applied, the base travels over a rotatable roller. This coater is followed directly by a magnetic device for orienting the magnetic particles in the applied layer, which device comprises a permanent magnet or an electromagnet arranged adjacent to said layer, the lines of force of the said magnet, in the applied layer, being parallel to the surface of the layer and to the direction of travel of the base. After having passed the orienting device, the coated base is fed directly to an apparatus for drying the layer.

EXAMPLE (a) A magnetic dispersion suitable for the manufacture of magnetic discs has a viscosity of 32 mPas. It is pumped through the apparatus shown in the drawing ($d_1 = 1.0$ mm, $d_2 = 0.1$ mm) at a throughput of 100 kg/h, with the disc 2 rotating at 3,000 rpm, and is then applied to a plastics film, after which the magnetic particles are oriented by means of an electromagnet. The magnetic layer is from 2 to 3 $\mu$m thick.

(b) In a Comparative Experiment, a magnetic dispersion identical to that used in (a) is treated, before application, by the process described in German Pat. No. 2,119,569. Before the dispersion is fed to the coater, it flows through a cylindrical stirring vessel of 6.5 cm internal diameter and 7 cm length, in which a shaft rotates, air being excluded. The shaft carries a dissolver disc which has saw teeth at its periphery. The diameter of the disc is 5 cm. The stirring vessel is sealed off from the atmosphere by means of a lid carrying a gasket. The dissolver disc rotates at 7,000 rpm. The magnetic dispersion is then applied, and the particles magnetically oriented, as described in (a).

(c) In a further Comparative Experiment, a magnetic dispersion identical to that used in (a) flows through the annular gap between the inner wall of a cylindrical vessel and a cylinder rotating therein. The cylinder, which has a length of 7 cm and a diameter of 3.5 cm, rotates at 6,000 rpm. The clearance between the cylinder and the inner wall of the vessel is from 0.1 to 0.3 mm. Here again, the magnetic dispersion is applied, and the particles magnetically oriented, as described in (a).

The orientation ratios achieved in the three experiments (a), (b) and (c) are:

| (a) | (b) | (c) |
| --- | --- | --- |
| 2.80 | 2.35 | 2.39 |

Experiments on an industrial scale have shown that an improvement in the orientation ratio of about 20% over that obtainable with conventional methods can be achieved with the process and apparatus according to the invention.

We claim:

1. In the manufacture of magnetic recording media in which a magnetic dispersion including a magnetic pigment dispersed in a binder containing a solvent is applied to a non-magnetic base, followed by magnetic orientation of the applied coating, a process for subjecting the magnetic dispersion, prior to its application to said base, to shear, said process comprising:

providing, between the smooth face of a rotatable disc and an adjacent smooth surface confronting said face, a gap extending substantially in a plane normal to the axis of the disc and tapering steadily toward the periphery of the disc, forcing the magnetic dispersion to flow, from a centrally disposed inlet of said gap, radially outwardly through said gap to said periphery and thence to an outlet port, and rotating said disc relatively to said adjacent surface to set up a shear gradient in the magnetic dispersion flowing through said gap.

2. A process according to claim 1, wherein the gap is dimensioned so that the shear gradient set up in the magnetic dispersion progressively increases as a function of the diameter d of the point of action of the disc in accordance with the equation $$D = \frac{n \times \pi}{60 \times (d_1 + d_2) \times (1/d - 0.0045)} \, [\text{sec}^{-1}]$$

where D is the shear gradient, n is the rotational speed of the disc relatively to said surface in revolutions per minute, $d_1$ is the distance by which the disc is spaced from said surface at said inlet and $d_2$ is the distance by which the disc is spaced from said surface at said periphery, d, $d_1$ and $d_2$ being in mm.

3. A process according to claim 1, wherein the inlet to the gap is disposed coaxially with said disc.

4. A process according to claim 1, wherein the gap is dimensioned so that the shear gradient in the gap is 500 $\text{sec}^{-1}$ immediately radially outwardly of said inlet.

5. A process according to claim 1, wherein the disc is rotated at a speed of from 500 to 5,000 revolutions per minute relatively to said surface.

6. A process according to claim 1, wherein the disc is rotated at a speed of from 2,000 to 3,500 revolutions per minute relatively to said surface.

7. A process according to claim 1, wherein the magnetic dispersion has a viscosity of from 25 to 50 mPas.

8. A process according to claim 1, wherein said forcing step includes pumping the magnetic dispersion through the gap at a throughput of from 100 to 280 kg/h.

* * * * *